(12) United States Patent
Klaus et al.

(10) Patent No.: US 7,421,928 B2
(45) Date of Patent: Sep. 9, 2008

(54) MOTOR VEHICLE DRIVE ARRANGEMENT

(75) Inventors: Andreas Klaus, Chemnitz (DE); Tobias Ostertag, Herrenberg (DE)

(73) Assignee: Daimler AG, Stuttgart (DE)

( * ) Notice: Subject to any disclaimer, the term of this patent is extended or adjusted under 35 U.S.C. 154(b) by 452 days.

(21) Appl. No.: 11/110,969

(22) Filed: Apr. 20, 2005

(65) Prior Publication Data

US 2005/0207915 A1      Sep. 22, 2005

Related U.S. Application Data

(63) Continuation-in-part of application No. PCT/EP03/011868, filed on Oct. 25, 2003.

(30) Foreign Application Priority Data

Nov. 2, 2002   (DE)   ................. 102 51 041

(51) Int. Cl.
  *F16H 57/02*   (2006.01)
  *B60W 10/02*   (2006.01)
  *B60K 1/00*   (2006.01)
(52) U.S. Cl. .................... 74/606 R; 475/5; 180/65.5
(58) Field of Classification Search ........... 74/606 R; 417/15–17, 37, 410.1; 475/5; 180/65.2–65.5
  See application file for complete search history.

(56) References Cited

U.S. PATENT DOCUMENTS 5,156,579 A * 10/1992 Wakuta et al. ............ 475/161
5,427,196 A * 6/1995 Yamaguchi et al. ........ 180/65.2
5,474,428 A * 12/1995 Kimura et al. ................ 417/16
6,100,615 A * 8/2000 Birkestrand ............... 310/75 C
6,340,339 B1 * 1/2002 Tabata et al. ................... 475/5
6,358,173 B1 * 3/2002 Klemen et al. ................. 475/5
6,592,486 B1 * 7/2003 Arbanas et al. ............... 475/84
6,746,354 B1 * 6/2004 Ziemer ........................ 475/5
6,863,140 B2 * 3/2005 Noreikat et al. ............ 180/65.2
2005/0265858 A1* 12/2005 Klaus et al. ................ 417/374

FOREIGN PATENT DOCUMENTS

| DE | 196 04 517 A1 | 8/1997 |
| DE | 196 15 929 A1 | 10/1997 |
| DE | 197 50 675 C1 | 8/1998 |
| DE | 199 23 154 A1 | 11/1999 |
| DE | 199 31 400 C2 | 1/2001 |
| EP | 0 559 342 A2 | 9/1993 |
| EP | 1 302 704 A2 | 4/2003 |
| JP | 09079119 A * | 3/1997 |
| JP | 11 030182 | 2/1999 |
| JP | 2000-356148 | 12/2000 |
| WO | WO 00/71887 | 11/2000 |

* cited by examiner

*Primary Examiner*—Roger Pang
(74) *Attorney, Agent, or Firm*—Klaus J. Bach

(57) ABSTRACT

In a motor vehicle drive arrangement having an electric motor with a rotor for driving an oil pump and being supported in an air space of a housing by a rotor disk of the rotor of the electric motor which is permanently connected to a pump rotor of the oil pump, a freewheeling mechanism for a mechanical drive of the pump rotor of the oil pump is provided for coupling the oil pump to a vehicle travel drive train of the vehicle drive arrangement when the travel drive train rotates faster than the electric motor.

20 Claims, 2 Drawing Sheets

MOTOR VEHICLE DRIVE ARRANGEMENT

This is a Continuation-In-Part Application of international application PCT/EP03/011868 filed Oct. 25, 2003 and claiming the priority of German application 102 57 041.5 filed Nov. 02, 2002.

BACKGROUND OF THE INVENTION

The invention relates to a motor vehicle drive arrangement with a gear mechanism having a variable transmission ratio and an oil pump for providing pressurized oil to the gear mechanism for operating shifting elements and an electric motor for driving the oil pump.

DE 199 23 154 A1 discloses a motor vehicle drive arrangement of this type in which an oil pump is connected to an electric motor via a freewheeling mechanism, and to a traveling drive train via another freewheeling mechanism. As a result, the oil pump is driven either by the electric motor or the traveling drive train as a function of the rotational speed. Only a very small amount of installation space is available in the engine cavity of motor vehicles so that it is difficult to accommodate the two freewheeling mechanisms and the electric motor.

In practice, motor vehicle drive devices are known whose travel drive train (motor vehicle drive train) includes an internal combustion engine and an automatic transmission arranged axially one behind the other, with the automatic transmission containing a hydrodynamic torque converter and a mechanical drive gear mechanism which contains planetary gearwheel sets and shifting elements for shifting the planetary gearwheel sets. The torque converter is located axially between the internal combustion engine and the mechanical drive gear mechanism. In order to operate the shifting elements (clutches and/or shifting brakes) and in order to cool the mechanical drive gear mechanism and to supply oil to the torque converter, an oil pump is provided which can be driven by the vehicle travel drive train via a mechanical drive connection. The oil pump is located axially between the torque converter and the mechanical drive gear mechanism, and surrounds a drive shaft.

Because of increasing demands to reduce fuel consumption and emissions, in future it will be necessary to adopt a start/stop operating mode of an internal combustion engine, for example at traffic lights in towns. In order to start the internal combustion engine conveniently, suitable starter/generators and various hybrid systems (travel drive systems containing at least two different drive motors, for example an internal combustion engine and at least one electric motor) have been developed.

The oil pump of the known automatic transmissions is driven by means of the pump wheel of the torque converter, which wheel is coupled permanently to the crankshaft of the internal combustion engine. As a result, when the internal combustion engine is shut down the oil pump cannot be driven so that, when the internal combustion engine is shut down, the oil pressure needed to operate the shifting elements (clutches and possibly shifting brakes) and also for lubrication cannot be maintained. As a result, it is not possible to start up the motor vehicle again quickly after the internal combustion engine has stopped. When starting up the motor vehicle it is then necessary to wait, after the internal combustion engine has started, until the oil system of the automatic transmission has been filled and a sufficiently high oil pressure level has built up in order to activate the shifting elements. This is very inconvenient under certain conditions and potentially dangerous. The requirement for convenience could be satisfied by driving the oil pump in accordance with the abovementioned DE 199 23 154 A1 or by providing an additional oil pump which is driven, when required, by an electric motor in order to maintain the oil supply and the oil pressure while the internal combustion engine is shut down. However, both solutions fail in most motor vehicles due to the fact that there is not sufficient installation space available in them and/or the existing components of the motor vehicle drive train would have to be changed, which would be very expensive and would also prevent series manufacture of different vehicles using identical components or identical assemblies.

It is the object of the invention to provide a drive arrangement, in particular for passenger cars, in such a way that the amount of oil which is necessary to start up and drive the motor vehicle and the oil pressure which is necessary for this purpose is present in the motor vehicle drive gear mechanism immediately after the vehicle drive unit, which may be an internal combustion engine or an electric motor or some other type of motor, is started, without the need for significant installation space. This object should be achieved in such a way that the arrangement can also be used for various types of known vehicles which are series-manufactured, without requiring a large degree of technical complexity or financial expenditure.

SUMMARY OF THE INVENTION

In a motor vehicle drive arrangement having an electric motor with a rotor for driving an oil pump and being supported in an air space of a housing by a rotor disk of the rotor of the electric motor which is permanently connected to a pump rotor of the oil pump, a freewheeling mechanism for a mechanical drive of the pump rotor of the oil pump is provided for coupling the oil pump to a vehicle travel drive train of the vehicle drive arrangement when the travel drive train rotates faster than the electric motor.

The arrangement does not require very much installation space. The oil pump can be driven by the electric motor when the vehicle travel drive motor is shut down or at a low rotational speed so that the motor vehicle is immediately ready to move when the travel drive motor starts. By accommodating the rotor of the electric motor in an air space, instead of in an oil-filled space, the driving resistance is significantly reduced and the efficiency thus improved.

The oil pump and its electric motor can be integrated into the housing of the drive device, for example into the housing of an automatic transmission, composed of a hydrodynamic torque converter and a mechanical transmission component.

The oil pump which is used in contemporary passenger cars can be retained. The electric motor is thus integrated into the housing in such a way that only small changes, or no changes to the known drive device are necessary. Depending on the design, a short extension of the converter housing may become necessary in order to provide additional installation space. However, there is no need for installation space for an additional external oil pump.

As a result of the integration of the oil pump and of its electric motor into the drive train of the motor vehicle, less installation space is required than if an additional, electrically driven oil pump and a mechanically driven oil pump would be used The sealing of the oil ducts is also simplified. There are no lines to be laid. The exchange of oil with the drive gear mechanism can be carried out, as in existing passenger cars, by means of ducts which are also already provided for this purpose.

According to one particular embodiment of the invention, the oil pump and its electrical motor are arranged on the transmission input side of the drive gear mechanism, where a space region is provided between the arrangement of the oil pump and its electric motor, on the one hand, and the vehicle travel drive motor, on the other. The space has the purpose of positioning at least one torque transmission device in the travel drive train, wherein the torque transmission device has at least one of the elements comprising a switchable clutch, torque converter and/or at least one further electric machine. The further electric machine can be connected to the vehicle travel drive train as an electric motor and as a generator.

As a result, the drive device can be used in a module system with which various motor vehicles, in particular passenger cars, can be equipped.

Preferred embodiments of the invention will be described below with reference to the accompanying drawings:

DESCRIPTION OF PREFERRED EMBODIMENTS

The drive device of the invention is advantageous in particular in passenger cars since space is particularly restricted there. However, the invention can also be used for any other type of motor vehicle.

Figure 1:
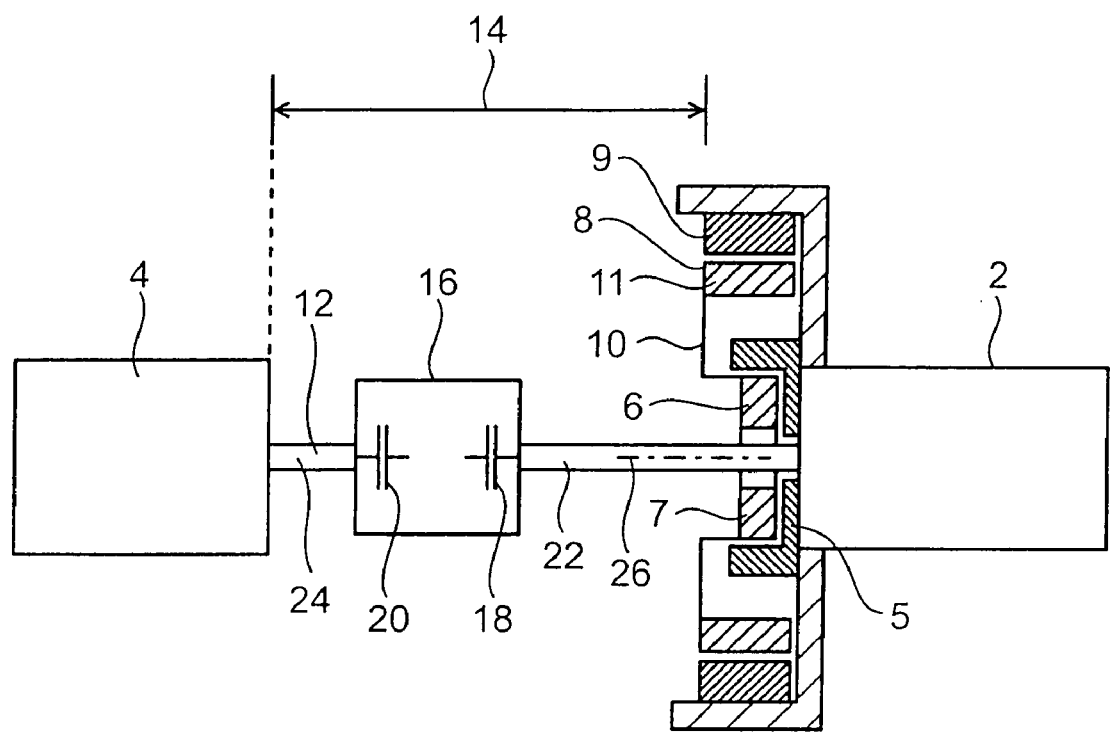
FIG. 1 is a schematic side view of a motor vehicle drive arrangement according to the invention.

As FIG. 1 shows, the drive arrangement of the invention comprises a motor vehicle drive gear mechanism 2 with a variable transmission ratio for transmitting torque in a drive train between a traveling drive motor 4 and at least one motor vehicle wheel. An oil pump 6 can be driven by an electric motor 8 in order to supply the drive gear mechanism 2 with pressurized oil for operating shifting elements of the drive gear mechanism and to cool the drive gear mechanism 2.

The electric motor 8 of the oil pump 6 may be an internal rotor-type motor or an external rotor-type motor. In the embodiments shown, the motor is an internal-rotor type which has a rotor 11 within a fixed stator 9.

The oil pump 6 has a pump housing 5 which is arranged in a nonrotating fashion, and a pump rotor 7 which is connected fixed in terms of rotation to the rotor 11 of the electric motor 8 by a permanently closed mechanical drive connection 10.

The travel drive motor 4 and the drive gear mechanism 2 are arranged co-axially and are connected or can be connected to one another in an intermediate drive train 12.

The oil pump 6 and the electric motor 8 are arranged on the transmission input side of the transmission 2 around an axis 26 of rotation of the intermediate drive train 12. A space 14 for accommodating at least one torque transmission device 16 in order to transmit torque in the intermediate drive train 12 is provided between the arrangement of the oil pump 6 and its electric motor 8, on the one hand, and the travel drive motor 4, on the other. The torque transmission device 16 has at least one of the elements comprising a switchable travel drive clutch, torque converter or at least one other electric machine, this element being arranged in the spacer region 14.

If the element is a hydrodynamic torque converter, it can then form, together with the drive gear mechanism 2, an automatic transmission. In this case, the drive gear transmission 2 can have shifting elements in the form of clutches and/or shifting brakes for changing gear speeds.

If the element is a switchable clutch, the drive gear mechanism 2 may be a manually shiftable transmission or an automatically shiftable transmission.

In addition, the element can be, or can have, at least one or more other electric machines which are connected, or can be connected, in terms of drive to the intermediate drive train 12. This other electric machine may be an electric motor in order to drive the drive gear mechanism 2 alone or in addition to the traveling drive motor 4. In addition, the other electric machine may be embodied in such a way that it can also be operated as a generator for producing electricity, in which case it can be driven by the travel, drive motor 4 or by the vehicle wheels. In addition, the other electric machine may be embodied as an electric starter motor for starting the travel drive motor 4 if the latter is an internal combustion engine.

In the embodiment shown, the intermediate drive train 12 in which the torque transmission device 16 is located contains a transmission input shaft 22 between the torque transmission device 16 and the drive gear mechanism 2, and a crankshaft 24, between the traveling drive motor 4 and the torque transmission device 16. A switchable clutch 18 or 20 can be provided between at least one of these shafts 22 and 24, on the one hand, and the torque transmission device 16, on the other, depending on the type of drive device.

The oil pump 6 and the electric motor 8 are preferably arranged around the intermediate drive train 12, preferably around the transmission input shaft 22.

According to preferred embodiments of the invention, the electric motor 8 has a larger external diameter than the oil pump 6. As a result, they can be positioned on various radii. According to one preferred embodiment, the oil pump 6 is arranged at least partially inside the electric motor 8 in the axial and radial directions.

The drive connection 10 is preferably formed by a rotor disk 10 which permanently connects the rotor 11 of the electric motor 8 to the pump rotor 7 of the oil pump 6 so that the two parts can only rotate together with one another and cannot be decoupled from one another. The oil pump 6 is arranged essentially completely within the electromagnetically active parts 9-1 and 11-1 of the electric motor 8 in the radial and axial directions so that the rotor disk 10 can extend essentially radially with respect to the axis 26 of rotation of the intermediate travel drive train 12.

The rotor disk structure 10 interconnecting the rotor 11 of the electric motor with the rotor 11 of the pump rotor 7 is preferably formed as a single piece with at least one of the two rotors. According to one particular embodiment, the rotor disk 10 can be a carrier for the electromagnetically active part 11-1 of the rotor 11 and/or be formed integrally with the pump rotor 7. According to another embodiment, the pump rotor 7 is attached to the rotor disk 10.

The particular embodiment shown in FIG. 2 will be described below. In this embodiment, identical parts to those in FIG. 1 are provided with the same reference numerals and only differences with respect to FIG. 1 are described for FIG. 2. Moreover, the description relating to FIG. 1 also applies to FIG. 2.

Figure 2:
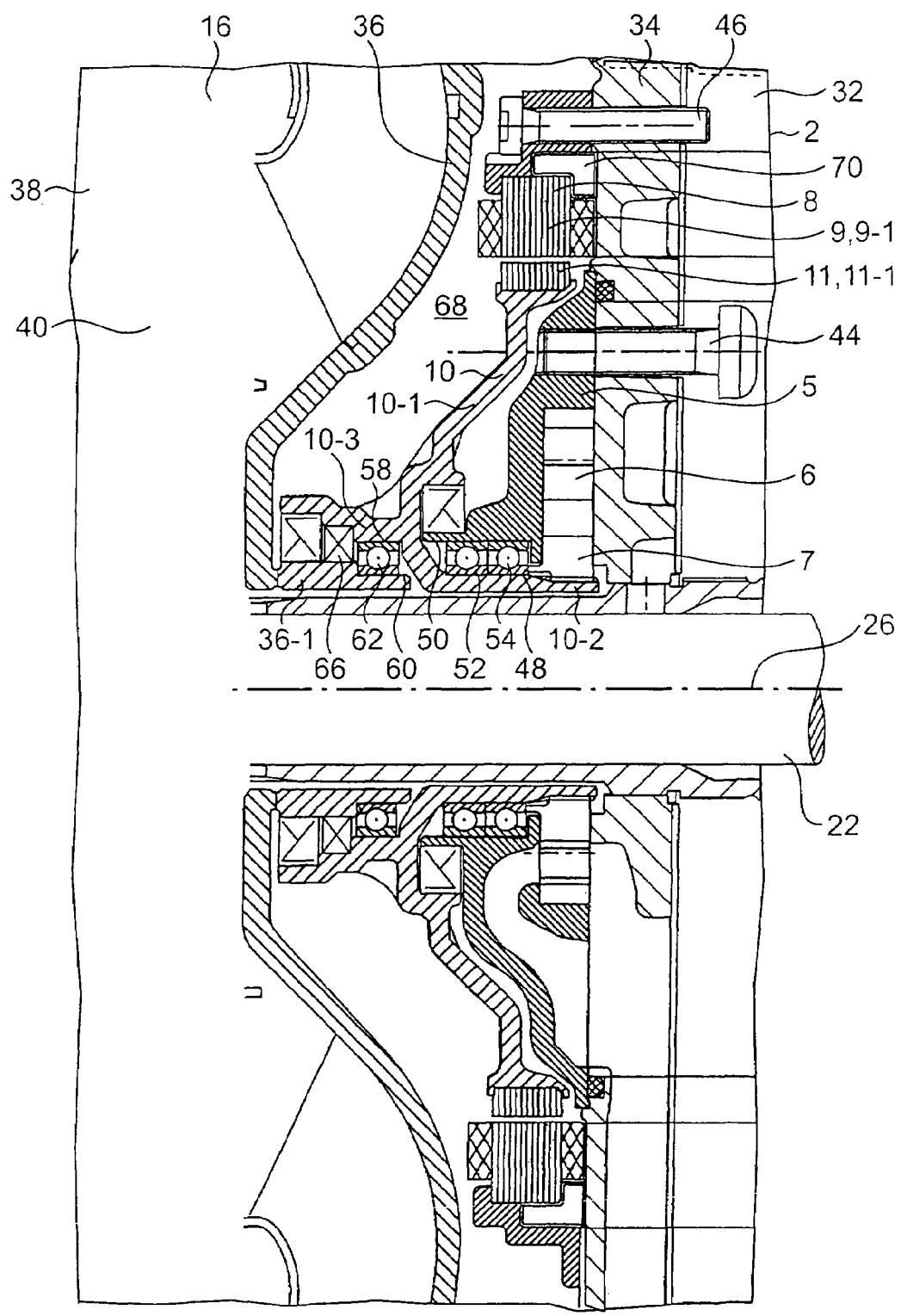
FIG. 2 shows in a sectional longitudinal view a particular embodiment of the motor vehicle drive device according to the invention.

In FIG. 2, as in FIG. 1, the oil pump 6 and the electric motor 8 are arranged so as to extend around the axis 26 of rotation of a travel drive shaft, which may be an engine output shaft or, in the embodiment shown, the transmission input shaft 22, or according to a different embodiment an intermediate shaft which is arranged axially therebetween.

A housing of the drive can contain the torque transmission device 16, which is a hydrodynamic torque converter in the examples shown, and the drive gear mechanism 2, which forms, together with the torque converter 16, an automatic transmission. According to the embodiment of FIG. 2, the drive housing comprises a gear mechanism housing 32 in which the drive gear mechanism 2 is accommodated, and an add-on housing 34 in which the torque converter 16 is accommodated. Only the flanges of the two housings 32 and 34 are shown in FIG. 2, said flanges being screwed to one another.

The hydrodynamic torque converter 16 includes an impeller wheel 36 which is drivingly connected, or can be connected via a traveling drive clutch (not shown), to the engine output shaft 24 of FIG. 1, at least one turbine wheel 34 which is connected to the transmission input shaft 22 so as to be fixed in terms of rotation, and at least one stator 40.

An oil pump housing 5 of the oil pump 6 and the stator 9 of the electric motor 8 are arranged in the add-on housing 34 and attached to the flange of this add-on housing 34, for example by means of screws 44 and 46, on the side facing away from the drive gear mechanism 2.

The rotor 11 of the electric motor 8 and the pump rotor 7 of the oil pump 6 are rotatably supported on the pump housing 5 of the oil pump 6.

For this purpose, the rotor disk 10 of the rotor 11 extends over the oil pump 6 on its front end side facing away from the drive gear mechanism 2. The rotor disk 10 is fitted at its radially outer disk end with the electromagnetically active rotor part 11-1 and on the radially inner disk end with a first bearing structure, preferably in the form of a hollow shaft part 10-2 which extends rearward from an annular disk part 10-1 of the rotor disk 10 as far as the pump rotor 7 and is connected to it for rotation therewith. This hollow shaft part 10-2 which projects rearward is mounted radially on the pump housing 5.

In order to form this radial support, the hollow shaft part 10-2 which projects rearward has a circumferential outer surface 48 radially opposite of which there is an inner surface 50 of the pump housing 5. These two surfaces 48 and 50 can form radial friction bearing faces which bear one against the other or are radially supported on one another by means of at least one or more bearings 52, 54 which are arranged between them.

According to FIG. 2, the annular disk part 10-1 also has, at its radially inner end region, a hollow shaft part 10-3 which extends axially forward and has a bearing structure in order to support the pump impeller wheel 36 of the torque converter 16 in the radial direction and, if desired, also in the axial direction.

For this purpose, the hollow shaft part 10-3 which projects forward can engage radially the inside or, according to FIG. 2, the outside, of a rearward-projecting hollow shaft part 36-1 of the pump impeller wheel 36, has a surface 58 which is disposed radially opposite the surface 60 of the hollow shaft part 36-1 which is directed rearward in the opposite direction. These two surfaces 58 and 60 may be friction bearing faces which bear one against the other or be fitted at least with one bearing 62 which is arranged between them and by means of which the pump impeller wheel 36 of the torque converter 16 is supported on the rotor disk 10 and thus on the rotor 11 in the radial direction, and if desired also in the axial direction.

As a result, the pump impeller wheel 36 is supported radially, and if appropriate also axially, on the pump housing 5 of the oil pump 6 by means of the rotor 11 or its rotor disk 10, and is rotatable both in relation to the rotor 11 and in relation to the pump housing 5.

In another embodiment (not shown), the pump impeller wheel 36 may be supported rotatably directly on the pump housing 5, not indirectly by means of the rotor disk 10.

According to a particular embodiment of the invention, the pump impeller wheel 7 of the oil pump 6 can be driven only by the rotor 11 of the electric motor 8. According to the embodiment of the invention as shown in FIG. 2, a single freewheeling mechanism 66 is provided by means of which the pump impeller wheel 36 of the torque converter 16, and thus also the engine output shaft 12 as shown in FIG. 1, can be coupled to the pump rotor 7 in order to drive the pump rotor 7 if the pump impeller wheel 36 of the torque converter 16 rotates more quickly than the rotor 11 of the electric motor 8, for example when the electric motor 8 is switched off.

The freewheeling mechanism 66 can be arranged directly between the pump rotor 7 of the oil pump 6 and a part, for example the rearward-projecting hollow shaft part 36-1, of the pump impeller wheel 36. According to the preferred embodiment which is shown in FIG. 2, the freewheeling mechanism 66 is located between the rearward-projecting hollow shaft part 36-1 of the pump impeller wheel 36 and the forward-projecting hollow shaft part 10-3 of the rotor disk 10, which hollow shaft part 10-3 extends radially outside the pump impeller wheel 36 across this hollow shaft part 36-1. As a result, the pump rotor 7 of the oil pump 6 can be driven by the pump impeller wheel 36 of the torque converter 16 via the freewheeling mechanism 66 and the rotor disk 10.

The electric motor 8, or at least its rotor 11, are arranged in an air space 68 inside the add-on housing 34. As a result, the rotor 11 has a significantly smaller rotation resistance than if it were arranged in an oil-filled space. The rotating rotor 11 can be cooled by the air in the air space 68. In order to cool the rotor further, but in particular in order to cool the stator 9 and its electromagnetically active stator part 9-1, a cooling duct arrangement with at least one cooling duct 70 is provided. The latter is preferably formed along the electromagnetically active part 9-1 of the stator 9 and cooling fluid can be conducted through it. Preferably the oil of the oil pump 6 serves as the cooling fluid, said oil flowing via ducts (not shown) from the oil pump 6 into the cooling duct 70 and back again into the oil pump 6. The oil duct 70 preferably extends around the entire circumference of the stator 9, preferably on its outside and preferably also on at least one end side in the region of the electromagnetically active stator part 9-1. According to another embodiment, a different cooling fluid from a different cooling source can be used instead of the oil from the oil pump 6.

In all the embodiments the electric motor 8 is independent of the travel drive train and its torques.

What is claimed is:

1. A motor vehicle drive arrangement comprising a motor vehicle drive gear mechanism (2) with a variable transmission ratio for transmitting torque in a drive train between a travel drive motor (4) and at least one motor vehicle wheel, an oil pump (6) for supplying the drive gear mechanism (2) with pressurized oil for operating shifting elements of the drive gear mechanism (2), and an electric motor (8) with a rotor (11) for driving the oil pump (6), the oil pump (6) and the electric motor (8) being arranged so as to extend around an axis (26) of rotation of the drive train and disposed in a drive housing (32, 34), the electric motor (8) having a stator (9) attached together with a pump housing (5) of the oil pump (6) to the drive housing (32, 34), and the rotor (11) of the electric motor (8) and a pump rotor (7) of the oil pump (6) being rotatably supported on the pump housing (5) of the oil pump (6).

2. The motor vehicle drive arrangement as claimed in claim 1, wherein the rotor (11) of the electric motor (8) is firmly connected to the pump rotor (7) of the oil pump (6) for rotation therewith.

3. The motor vehicle drive arrangement as claimed in claim 1, wherein the electric motor (8) has a larger external diameter than the oil pump (6), the rotor (11) of the electric motor (8) has a rotor disk (10) which extends radially across the oil pump (6) on its side facing away from the drive gear mechanism (2), and the rotor disk (10) has a radially outer end which is connected to a part of the rotor (11) of the electric motor (8) which extends around the oil pump (6) and a radially inner end which is firmly connected to the pump rotor (7) of the oil pump (6) for rotation therewith and has a first bearing structure (10-2) by means of which the rotor (11) of the electric motor (8) is rotatably supported on the pump housing (5).

4. The motor vehicle drive arrangement as claimed in claim 3, wherein the rotor disk (10) has, at the first bearing structure (10-2), a circumferential outer surface (48) opposite of which there is an inner surface (50) of the pump housing (5), and these two surfaces (48, 50) are supported so as to be rotatable in relation to one another.

5. The motor vehicle drive arrangement as claimed in claim 4, wherein at least one non-friction bearing (52, 54) is located between the outer and inner surfaces (48, 50).

6. The motor vehicle drive arrangement as claimed in claim 3, wherein the first bearing structure (10-2) is formed by a hollow shaft extension of the rotor disk (10) extending, in the direction of the oil pump (6) from an annular disk part (10-1) of the rotor disk (10).

7. The motor vehicle drive arrangement as claimed in claim 6, wherein the pump rotor (7) of the oil pump (6) is supported by the hollow shaft extension.

8. The motor vehicle drive arrangement as claimed in claim 1, wherein the oil pump (6) and its electric motor (8) are arranged on the transmission input side of the drive gear mechanism (2) and a space (14) is provided between the oil pump (6) and its electric motor (8) and the travel drive motor (4), said space (14) having the purpose of accommodating at least one torque transmission device (16) for transmitting torque to the travel drive train, wherein the torque transmission device (16) includes at least one of a switchable clutch (18, 20), a torque converter and an electric machine.

9. The motor vehicle drive arrangement as claimed in claim 8, wherein the torque transmission device includes a hydrodynamic torque converter (16) which is arranged in front of the oil pump (6) facing away from the drive gear mechanism (2) in spaced relationship from the oil pump, and forms, together with the drive gear mechanism (2), an automatic transmission, a pump impeller wheel (36) of the torque converter (16) being rotatably supported by the pump housing (5) of the oil pump (6).

10. The motor vehicle drive arrangement as claimed in claim 9, wherein the pump impeller wheel (36) of the torque converter (16) is rotatably supported on the rotor (11) of the electric motor (8).

11. The motor vehicle drive arrangement as claimed in claim 10, wherein the rotor disk (10) of the electric motor (8) has a radially inner end region forming a second bearing structure (10-3) on which the pump impeller wheel (36) of the torque converter (16) is rotatably supported.

12. The motor vehicle drive arrangement as claimed in claim 11, wherein the rotor disk (10) has, on the second bearing structure (10-3), a radially inner surface (58) and, opposite thereof, the pump impeller (36) has a radially outer surface (60) and these two opposite surfaces (58, 60) are rotatably supported relative to one another.

13. The motor vehicle drive arrangement as claimed in claim 12, wherein at least one bearing (62) is located between the two opposite surfaces (58, 60) to support them one on the other.

14. The motor vehicle drive arrangement as claimed in claim 11, wherein the second bearing structure is formed by a hollow shaft extension (10-3) of the rotor disk (10) which projects from the rotor disk (10) in the direction away from the oil pump (6).

15. The motor vehicle drive arrangement as claimed in claim 1, wherein a freewheeling mechanism (66) is provided for mechanically coupling the rotor (11) of the electric motor (8) to the traveling drive train (36) if the rotational speed of the traveling drive train (36) is higher than the rotational speed of the rotor (11) of the electric motor (8).

16. The motor vehicle drive arrangement as claimed in claim 15, wherein the freewheeling mechanism (66) is arranged between the front hollow shaft part (10-3) of the rotor disk (10) of the electric motor (8) and the pump impeller wheel (36) of the torque converter (16).

17. The motor vehicle drive arrangement as claimed in claim 1, wherein the oil pump (6) is arranged at least partially radially inside of the stator (9) and the rotor (11) of the electric motor (8).

18. The motor vehicle drive arrangement as claimed in claim 1, wherein the electric motor (8) is arranged in an air space (68).

19. The motor vehicle drive arrangement as claimed in claim 18, wherein, in order to cool the electric motor (8), it is provided with a cooling duct arrangement (70) for circulating cooling fluid through the motor (8).

20. The motor vehicle drive arrangement as claimed in claim 19, wherein the cooling duct arrangement (70) is connected to the oil pump (6) for conducting oil from the oil pump through the motor (8) along the electromagnetically active parts thereof for cooling the electric motor (8).

* * * * *